C. W. STARKER.
DYNAMO ELECTRIC MACHINE.
APPLICATION FILED JUNE 28, 1911.

1,159,121.   Patented Nov. 2, 1915.

WITNESSES:
Fred H Miller

INVENTOR
Charles W. Starker
BY
Wesley G. Carr
ATTORNEY

UNITED STATES PATENT OFFICE.

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,159,121.   Specification of Letters Patent.   Patented Nov. 2, 1915.

Application filed June 23, 1911. Serial No. 635,906.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Dynamo-Electric Machines, of which the following is a specification.

My invention relates to dynamo-electric machines and it has special reference to such machines as comprise laminated stator core members which are clamped between end rings or other suitable members in lieu of the usual frame structures.

The object of my invention is to provide a stator of the class above indicated, with simple and inexpensive means for supporting the motor and, at the same time, preventing any relative displacement between the laminæ of which the core member is composed or between the end members to which the laminæ are secured.

Induction motors and other dynamo-electric machines, as heretofore usually constructed, comprise a cylindrical frame having foot projections, end brackets in which shaft bearings are supported and substantially cylindrical laminated core members assembled in the cylindrical frames and clamped to them by end plates which are held in position by suitable keys.

According to my present invention, I provide a base which is preferably stamped or punched from sheet steel and is particularly adapted for use with so-called frameless machines. When used in this connection, the base is riveted, or otherwise secured to the two end members in such manner as to preclude relative displacement of such members and the laminæ of which the core structure is composed. This is particularly important in an induction motor or other similar machine having a very small air gap between the stationary and rotating parts, since even a very slight lateral displacement of the core plates or the end members renders the machine inoperative.

Figure 1:
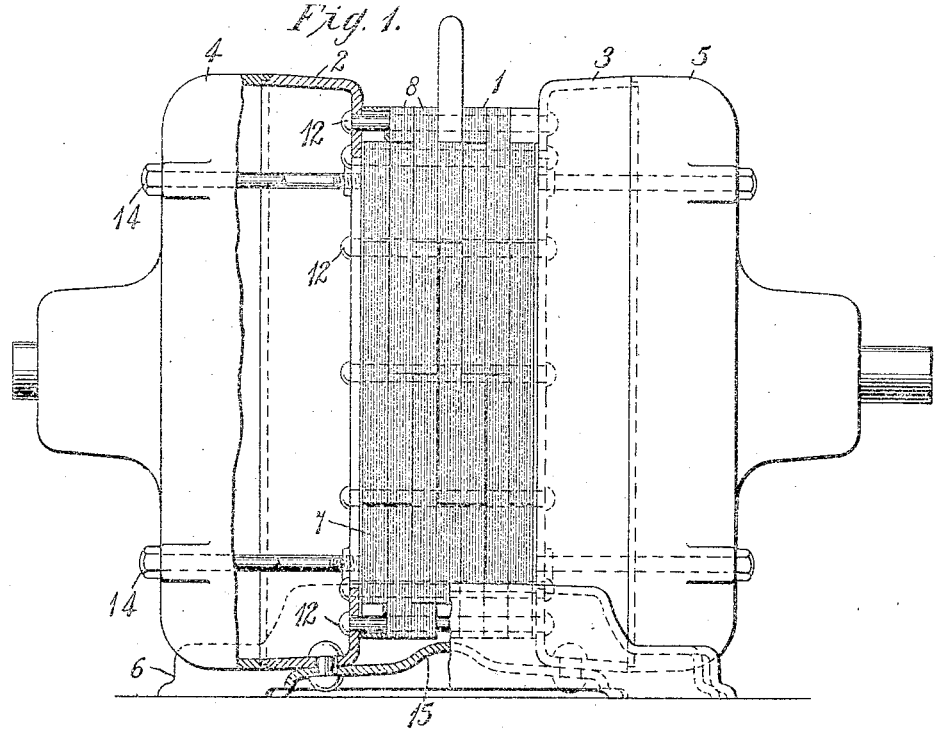
Figure 2:
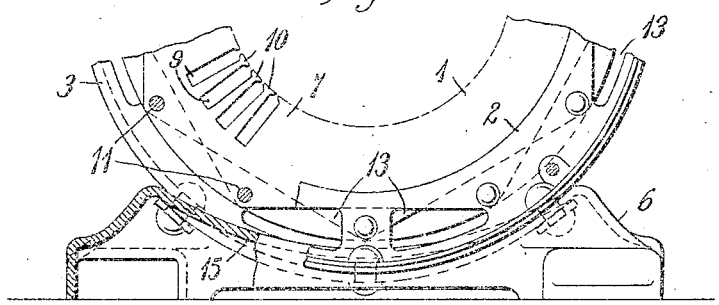

Figure 1 of the accompanying drawings is a partially sectional elevation of a motor embodying my invention. Fig. 2 is a view, partially in end elevation and partially in section, of a portion of the motor shown in Fig. 1.

Referring to the drawings, the motor here shown comprises a laminated core member 1, a pair of end rings 2 and 3, end brackets 4 and 5 and a base or supporting structure 6. The core structure 1 is composed of a large number of punched plates or laminæ 7 of polygonal form and arranged in groups 8, as shown in Fig. 1, and staggered or skewed, as shown in Fig. 2. Each of the plates is provided with a central opening which determines the bore of the machine, adjacent to which slots 9 are cut to produce the usual core teeth 10. Each of the core plates is substantially square in outline, the corners being rounded, however, in order to reduce the cost of the motor and the amount of scrap material resulting from the manufacture of the core members. By utilizing the staggered arrangement of groups, as shown, the sectional area and the magnetic reluctance are substantially the same at all points in the magnetic circuit.

Holes 11 are provided in the corners of the plates to receive bolts or rivets 12 which hold the plates together and clamp them to the end rings 2 and 3. The end rings 2 and 3, which are slightly larger in diameter than the core structure, are of substantially L-shape in cross section and are provided with holes 13 through which a circulation of air may be set up across the outer surface of the core member by the use of fan blades (not shown) or other suitable means carried by the rotating part of the machine, in a well-known manner.

The base or supporting member 6 is riveted, or otherwise secured, to the rings 2 and 3 and is preferably stamped or punched from relatively heavy sheet steel in order to permanently fix the relative positions of the members 2 and 3 and to preclude any lateral displacement of the laminæ. The base has the form of a saddle and is provided with a segmental curved inset portion 15 to constitute a support for the plates which are located in and adjacent to the central plane of the core member 1. The end brackets 4 and 5 may be of any suitable form and are secured to the rings 2 and 3 by means of bolts 14. The skewed arrangement of core groups provides a very large external radiating surface and, since the core member is not surrounded by any of the usual frame structures, it is evident that the temperature of the motor will be relatively low under normal operating conditions.

Modifications in size and arrangement of parts may, of course, be made within the spirit and scope of my invention.

I claim as my invention:

1. A stator for a dynamo-electric machine comprising annular end members of substantially L-shape in cross section, an interposed laminated core clamped between the vertical portions of said end members and a sheet metal base member provided with curved seats upon which the horizontal portions of the said end members are mounted and to which they are riveted.

2. A stator for a dynamo-electric machine comprising a pair of annular end members of substantially L-shape in cross section, an interposed laminated core clamped between the vertical portions of said end members and a sheet metal base member provided with curved seats of substantially the same curvature as the outer peripheries of the horizontal portions of said end members and to which said horizontal portions are secured.

3. A stator for a dynamo-electric machine comprising annular end members, an interposed laminated core clamped between the said end members and a base member provided with curved seats upon which the said end members are mounted, the said base member being further provided with a curved inset for supporting a portion of the said core intermediate the said end members.

4. A base member for dynamo-electric machines comprising a punched or stamped saddle having a segmental curved inset formed in it.

In testimony whereof, I have hereunto subscribed my name this 20th day of June, 1911.

CHARLES W. STARKER.

Witnesses:
GRAY E. MILLER,
B. B. HINES.